US012530440B2

(12) United States Patent
Zhang (10) Patent No.: US 12,530,440 B2
(45) Date of Patent: Jan. 20, 2026

(54) INFORMATION PROCESSING DEVICE, PERMISSION DETERMINATION METHOD, AND PROGRAM

(71) Applicant: OMRON Corporation, Kyoto (JP)

(72) Inventor: Chao Zhang, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 305 days.

(21) Appl. No.: 18/000,259

(22) PCT Filed: Jun. 3, 2021

(86) PCT No.: PCT/JP2021/021149
§ 371 (c)(1),
(2) Date: Nov. 29, 2022

(87) PCT Pub. No.: WO2021/256275
PCT Pub. Date: Dec. 23, 2021

(65) Prior Publication Data
US 2023/0222193 A1     Jul. 13, 2023

(30) Foreign Application Priority Data

Jun. 17, 2020  (JP) ................................. 2020-104753

(51) Int. Cl.
*G06F 21/32* (2013.01)
(52) U.S. Cl.
CPC ...... *G06F 21/32* (2013.01); *G06F 2221/2103* (2013.01)
(58) Field of Classification Search
CPC .. G06F 21/32; G06F 2221/2103; G06F 21/31; G07C 9/37
See application file for complete search history.

(56) References Cited

U.S. PATENT DOCUMENTS 11,328,532 B2 *  5/2022  Harris ................... G06V 40/172
11,663,307 B2 *  5/2023  Uzun ....................... G06F 21/32
                                                                713/186
(Continued)

FOREIGN PATENT DOCUMENTS

JP       2005097976 A       4/2005
JP       2007004796 A       1/2007
(Continued)

OTHER PUBLICATIONS

International Search Report issued in Intl. Appln. No. PCT/JP2021/021149 mailed Aug. 31, 2021. English translation provided.
(Continued)

*Primary Examiner* — Khalid M Almaghayreh
(74) *Attorney, Agent, or Firm* — ROSSI, KIMMS & McDOWELL LLP (57) ABSTRACT

An information processing apparatus includes a requester that requests a user to perform an action in response to the user seeking permission, an obtainer that obtains user information about the user in response to the user being requested to perform the action, a determiner that determines whether to provide the permission to the user based on the user information, and a controller that performs control to repeatedly cause, in response to the determiner determining that the permission is not to be provided to the user, the requester to request the user to perform a new action not previously requested by the requester, the obtainer to obtain new user information about the user, and the determiner to determine whether to provide the permission based on the new user information.

15 Claims, 7 Drawing Sheets

(56) References Cited

U.S. PATENT DOCUMENTS

| | | | |
|---|---|---|---|
| 2002/0049904 A1* | 4/2002 | Nowottnick | G07C 9/00857 380/46 |
| 2006/0294390 A1* | 12/2006 | Navratil | G06F 21/31 713/182 |
| 2008/0077791 A1* | 3/2008 | Lund | H04L 9/3273 713/156 |
| 2008/0222722 A1 | 9/2008 | Navratil et al. | |
| 2012/0311342 A1* | 12/2012 | Nuzzi | H04L 63/08 713/182 |
| 2016/0180072 A1* | 6/2016 | Ligatti | G06F 21/40 726/7 |
| 2017/0124312 A1* | 5/2017 | Inoue | G06F 21/32 |
| 2017/0250968 A1* | 8/2017 | Licht | H04L 63/08 |
| 2018/0337909 A1* | 11/2018 | Licht | H04L 9/3271 |
| 2019/0188366 A1 | 6/2019 | Inoue | |
| 2020/0089851 A1* | 3/2020 | Kumar Agrawal | G06V 20/52 |
| 2021/0110015 A1* | 4/2021 | McCarty | G06F 21/32 |
| 2022/0179933 A1* | 6/2022 | Embrechts | G06N 20/10 |
| 2023/0058053 A1* | 2/2023 | Hunt | H04L 9/3271 |
| 2023/0262054 A1* | 8/2023 | Marasco | H04L 63/0861 726/4 |
| 2023/0342489 A1* | 10/2023 | Isshiki | G09C 1/00 |

FOREIGN PATENT DOCUMENTS

| | | |
|---|---|---|
| JP | 2007169923 A | 7/2007 |
| JP | 2017224186 A | 12/2017 |
| JP | 2019052476 A | 4/2019 |
| WO | 2015194135 A1 | 12/2015 |

OTHER PUBLICATIONS

Written Opinion issued in Intl. Appln. No. PCT/JP2021/021149 mailed Aug. 31, 2021. English translation provided.

* cited by examiner

| $a_1$ | $a_2$ | $a_3$ | P (%) |
|---|---|---|---|
| 0-10 | 0-10 | 0-10 | 99 |
| 0-10 | 0-10 | 11-20 | 97 |
| 0-10 | 0-10 | 21-30 | 96 |
| ... | ... | ... | ... |
| 41-50 | 0-10 | 11-20 | 87 |
| 41-50 | 0-10 | 21-30 | 86 |
| 41-50 | 0-10 | 31-40 | 85 |
| ... | ... | ... | ... |
| 90-100 | 90-100 | 111-120 | 2 |
| 90-100 | 90-100 | 121- | 1 |

FIG. 6B

| $a_1$ | $a_2$ | $a_3$ | $P_1$ (%) | $P_2$ (%) | $P_3$ (%) |
|---|---|---|---|---|---|
| 0-10 | 0-10 | 0-10 | 50 | 49 | 1 |
| 0-10 | 0-10 | 11-20 | 49 | 47 | 3 |
| 0-10 | 0-10 | 21-30 | 48 | 48 | 4 |
| ... | ... | ... | ... | ... | ... |
| 41-50 | 0-10 | 11-20 | 40 | 45 | 15 |
| 41-50 | 0-10 | 21-30 | 40 | 44 | 16 |
| 41-50 | 0-10 | 31-40 | 40 | 43 | 17 |
| ... | ... | ... | ... | ... | ... |
| 90-100 | 90-100 | 111-120 | 1 | 1 | 98 |
| 90-100 | 90-100 | 121- | 0 | 1 | 99 |

FIG. 7

INFORMATION PROCESSING DEVICE, PERMISSION DETERMINATION METHOD, AND PROGRAM

TECHNICAL FIELD

The present invention relates to an information processing apparatus, a permission determination method, and a permission determination program.

BACKGROUND ART

For a user attempting to enter a building with restricted entry, user information held by the user (e.g., information about a key or an authentication card, iris information, or facial information) is compared with preregistered information to determine whether the entry is to be permitted. For example, the face of the user attempting the entry may be compared with a preregistered photograph of the user's face to determine whether the entry is to be permitted.

Patent Literature 1 describes a technique for permitting entry of a user in response to both an identification (ID) associated with a card key held by the user matching a preregistered ID and biometric information about the user matching preregistered biometric information.

Patent Literature 2 describes a technique using a personal identification number (PIN) preregistered with the system by an office employee and notified to the user. The technique permits entry of the user into the office in response to the PIN being input into the system by the user attempting to enter the office.

Patent Literature 3 describes a technique for authenticating a visitor based on matching between one or both of new registration information about a new visitor and past visit history information preregistered with the system and visitor information at the time of the visit.

PRIOR ART DOCUMENTS

Patent Document

Patent Literature 1: Japanese Unexamined Patent Application Publication No. 2007-169923
Patent Literature 2: Japanese Unexamined Patent Application Publication No. 2005-097976
Patent Literature 3: Japanese Unexamined Patent Application Publication No. 2019-052476

SUMMARY OF THE INVENTION

Problems to be Solved by the Invention

The three techniques described above are highly secure, but use preregistered information held by the user, or information for identifying the user preregistered with the system. With these techniques, a user who seeks temporary use of a building or another facility also preregisters or obtains information in advance, thus lowing the convenience in using the building or facility.

One or more aspects of the present invention are directed to a technique that allows permission to be provided while having high security and convenience to a user who seeks temporary permission.

Means for Solving the Problem

In response to this, the technique according to one or more aspects of the present invention has the structure described below.

An information processing apparatus according to a first aspect of the present invention includes a requester that requests a user to perform an action in response to the user seeking permission, an obtainer that obtains user information about the user in response to the user being requested to perform the action, a determiner that determines whether to provide the permission to the user based on the user information obtained by the obtainer, and a controller that performs control to repeatedly cause, in response to the determiner determining that the permission is not to be provided to the user, the requester to request the user to perform a new action not previously requested by the requester, the obtainer to obtain new user information about the user, and the determiner to determine whether to provide the permission based on the new user information.

The information processing apparatus with the above structure determines whether to provide permission to the user based on information about the user at the time of the action (e.g., a captured video of the user or a voice from the user). This structure allows determination as to whether the permission is to be provided without the user either preregistering information with the information processing apparatus or obtaining a password in advance. The permission herein may be any permission, such as permission to pass through a gate, permission to enter a building, or permission to access data.

In the information processing apparatus according to the above aspect, the controller may perform control to repeatedly perform, in response to the determiner determining that the permission is not to be provided to the user, the requester to request the user to perform the new action, the obtainer to obtain the new user information about the user, and the determiner to determine whether to provide the permission based on the new user information until the determiner determines that the permission is to be provided to the user. This structure repeatedly requests a new action until the determiner determines that permission is to be provided to the user. Any suspicious individual who intends to avoid being identified through multiple actions may not respond to the request. This reduces the likelihood of permission being erroneously provided to such a suspicious individual.

In the information processing apparatus according to the above aspect, the action requested by the requester may be at least one selected from a group consisting of an action associated with a face, an action associated with clothing, and an action associated with baggage. The actions associated with these items are easily observable from the appearance. For these actions, user information is easily obtainable for determining whether the user is a person to be provided with permission.

In the information processing apparatus according to the above aspect, the obtainer may obtain the user information from an image of the user captured in response to the user being requested to perform the action. The captured image of the user may be at least one selected from a group consisting of an image of a face of the user, an image of baggage held by the user, and an image of clothing of the user. The user information includes, for example, the reaction of the user in response to a request to perform the action. The user information can thus be obtained easily using the image of the user captured when the user is requested to perform the action.

In the information processing apparatus according to the above aspect, the user information may include information about time from when the user is requested to perform the action to when the user performs the action. For example, any user who is not a person to be provided with permission may take time in deciding whether to perform the requested action and thus may take more time before performing the action. This tendency may be used for more accurate determination as to whether the permission is to be provided.

In the information processing apparatus according to the above aspect, the user information may include information about a degree by which a face of the user is covered at a time of the action being requested. The user information may be information about at least one selected from a group consisting of a size of baggage held by the user and a type of the baggage held by the user in response to the user being requested to perform the action. The determiner may determine that the permission is to be provided when, for example, the degree by which the face of the user is covered is less than the threshold.

In the information processing apparatus according to the above aspect, the determiner may calculate, based on the user information, a score indicating whether the user is a person to be provided with the permission, and determine that the permission is to be provided to the user in response to the score being greater than or equal to a predetermined threshold. In the information processing apparatus according to the above aspect, the determiner may calculate, based on the user information, a probability of the user being a person to be provided with the permission, and determine that the permission is to be provided to the user in response to the probability being greater than or equal to a predetermined threshold. The predetermined threshold may be determined freely by the operator of the information processing apparatus or may be determined by the information processing apparatus based on the accuracy of previous determination results. The predetermined threshold may be varied based on each permission to be provided. For example, the information processing apparatus may use a predetermined threshold set higher when determining whether to permit entry into a privately owned area such as an entrance area of an apartment building than when determining whether to permit entry into a public area such as a park. More specifically, the predetermined threshold may be set differently depending on the public nature of the permission. The predetermined threshold may be set higher for any permission to be provided to fewer persons and thus having higher security.

In the information processing apparatus according to the above aspect, the determiner may calculate, based on the user information, a probability of the user corresponding to a type of a plurality of types including a type of a person to be provided with no permission, and determine that the permission is to be provided to the user in response to the probability of the user corresponding to the person to be provided with no permission not being the highest of the probabilities of the user corresponding to the plurality of types. The determiner may provide a different permission to the user in response to a type determined to correspond to the user with the highest of the probabilities. This structure allows different permissions to be provided to different users depending on the determined type of each user. This minimizes permissions to be provided to users and thus improves security. This also allows more flexibility in providing permissions to users.

In the information processing apparatus according to the above aspect, in response to the obtainer obtaining first information being the user information about a first action and the determiner determining that the permission is not to be provided to the user based on the first information, the requester may request the user to perform a second action, the obtainer may obtain second information being the user information about the second action, and the determiner may determine whether to provide the permission based on the first information and the second information. This structure uses multiple pieces of information in determining whether to provide permission, and thus allows permission to be provided to a more relevant person than when using a single piece of information in the determination.

One or more aspects of the present invention may be directed to a controller (processor), a permission apparatus or an authentication apparatus, or an authentication system including at least one of the elements in the above aspects. One or more aspects of the present invention may also be directed to a determination method or a control method for an information processing apparatus including at least one of the processes in the above aspects. One or more aspects of the present invention may be directed to a program for implementing the method or a non-transitory storage medium storing the program. The above elements and processes may be combined with one another in any possible manner in one or more aspects of the present invention.

Effect of the Invention

The technique according to the above aspects allows permission to be provided while having high security and convenience to a user who seeks temporary permission.

MODE FOR CARRYING OUT THE INVENTION

Application Example

A security system 10 according to an embodiment will now be described. The security system 10 requests a user to perform an action and determines whether to provide, to the user, permission to, for example, pass through a gate 12 based on user information about the user (e.g., a captured video of the user) at the time of the action being requested. When determining not to provide permission to the user, the security system 10 requests the user to perform a new action and determines whether to provide permission again based on new user information. The security system 10 according to the present embodiment does not request a user to preregister information about the user, or does not cause a user to obtain information in advance such as a password to receive permission. The security system 10 can thus provide permission to a user without the user preregistering information or obtaining a password.

First Embodiment

[Structure of Security System]

Figure 1:
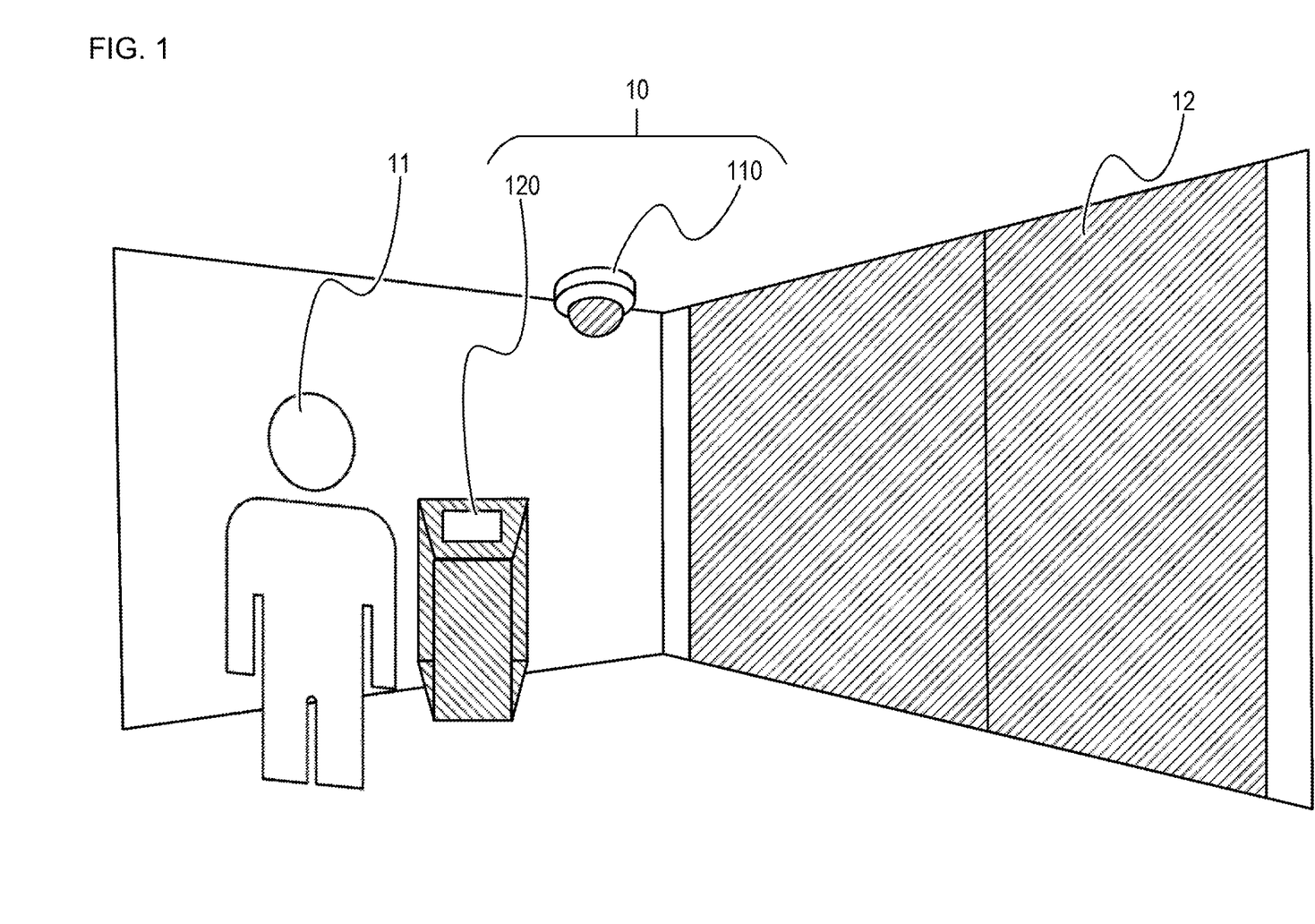
FIG. 1 is a schematic diagram of a security system according to a first embodiment.
Figure 2:
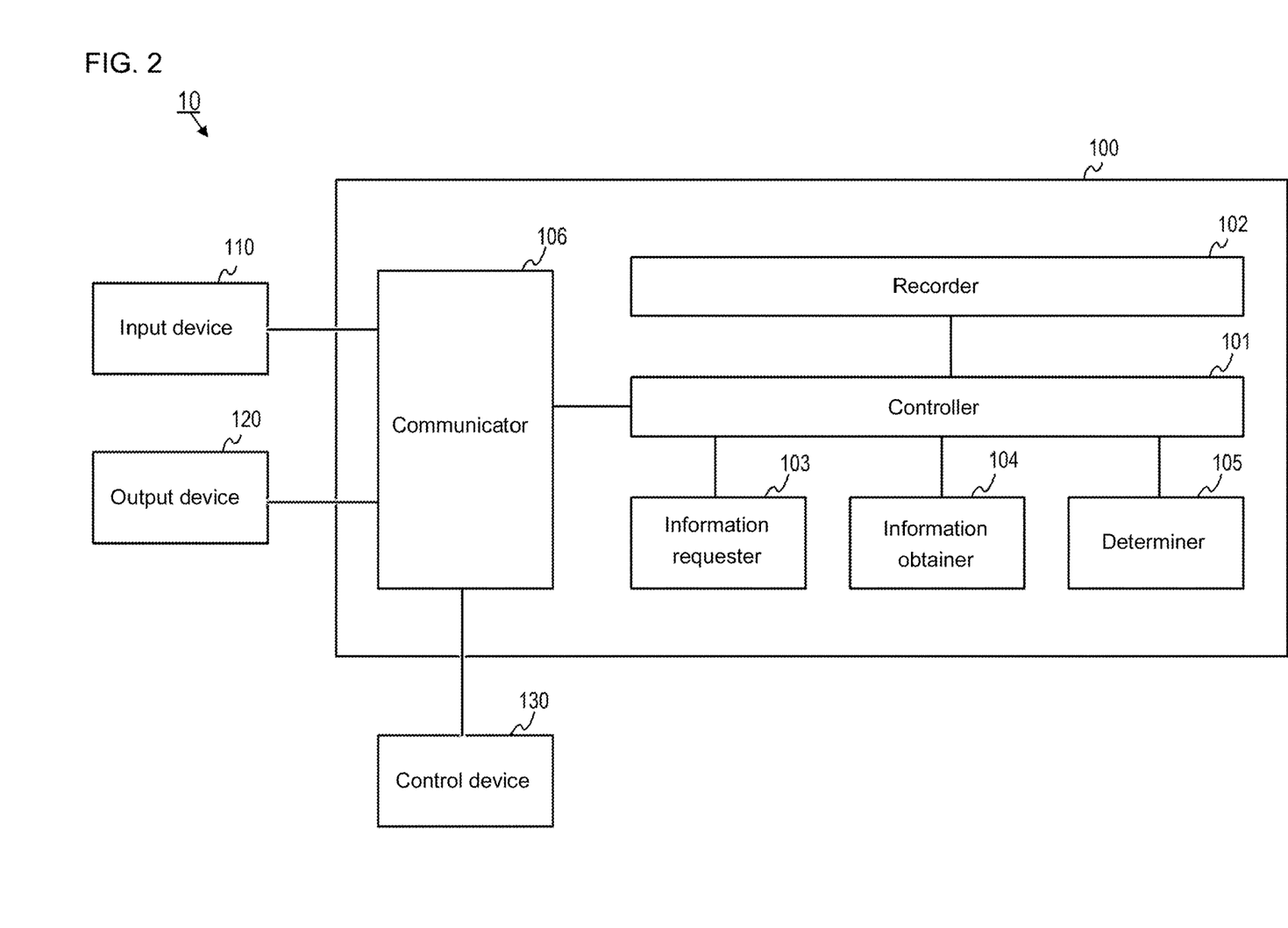
FIG. 2 is a block diagram of the security system according to the first embodiment.

Referring to FIGS. 1 and 2, the structure of the security system 10 according to the present embodiment will be described. FIG. 1 is a schematic diagram describing an example use of the security system 10. The security system 10 according to the present embodiment determines, for example, whether to permit a user 11 to pass through the gate 12 in, for example, an entrance area of an apartment building or a hotel. The security system 10 causes the gate 12 to open when determining to permit the passage through the gate 12. The user 11 can then pass through the gate 12 and move to a destination.

FIG. 2 is a block diagram of the security system 10. The security system 10 includes an information processing apparatus 100, an input device 110, an output device 120, and a control device 130.

The information processing apparatus 100 determines whether to permit a user to pass through the gate 12 using action information obtained by the input device 110 based on an action performed by the user. To obtain the action information, the information processing apparatus 100 outputs information requesting a predetermined action to the output device 120. When permitting the passage through the gate 12, the information processing apparatus 100 outputs information indicating the permission to the control device 130.

The information processing apparatus 100 may be any device that can process information, such as a personal computer (PC) or a server. The information processing apparatus 100 may be located, for example, in the cloud (on the Internet), instead of being installed in the same building (or site) as where the input device 110 and the output device 120 are located.

The input device 110 receives action information indicating the current action of the user who attempts to pass through the gate 12 (the user who attempts to enter a building or a room). The input device 110 may be, for example, an imaging device such as a camera, or an audio receiver such as a microphone. The input device 110 can receive, as the action information, a captured image (a still image or a video) of the current user or a voice heard from the user. The input device 110 may further include a range sensor that obtains the distance between the input device 110 and the user as the action information. The input device 110 may include, for example, an imaging button to start imaging or a motion sensor to detect a user nearby.

The output device 120 requests the user to perform a predetermined action based on information requesting a predetermined action received from the information processing apparatus 100. The predetermined action herein refers to, for example, an action of taking off an object covering the face of the user (e.g., a cap or a face mask) or an action of placing baggage at a predetermined location. The output device 120 outputs, for example, a voice message requesting the user to perform a predetermined action, or may display a request to perform a predetermined action. The output device 120 may be an audio output device, such as a speaker that outputs a voice message, or a display device, such as a display or a projector that shows images.

When receiving information to permit the user to pass through the gate 12 from the information processing apparatus 100, the control device 130 causes the gate 12 to open.

The information processing apparatus 100, the input device 110, the output device 120, and the control device 130 may each be a computer including, for example, a central processing unit (CPU) or a processor, a memory, and a storage. In this case, the structure shown in FIG. 2 is implemented by loading a program stored in the storage into the memory and by the CPU executing the program. The computer may be a general-purpose computer such as a personal computer, a server computer, a tablet, or a smartphone or a built-in computer such as an onboard computer. In some embodiments, some or all of the components shown in FIG. 2 may be formed using an application-specific integrated circuit (ASIC) or a field-programmable gate array (FPGA). In some embodiments, some or all of the components shown in FIG. 2 may be implemented by cloud computing or distributed computing. The information processing apparatus 100 may include at least one of an input unit corresponding to the input device 110, an output unit corresponding to the output device 120, or a controller corresponding to the control device 130.

(Structure of Information Processing Apparatus)

The structure of the information processing apparatus 100 will now be described with reference to FIG. 2. The information processing apparatus 100 includes a controller 101, a recorder 102, an information requester 103, an information obtainer 104, a determiner 105, and a communicator 106.

The controller 101 controls the functional units included in the information processing apparatus 100. The controller 101 may be, for example, a CPU. The controller 101 executes programs stored in the recorder 102 to control these functional units.

The recorder 102 records (stores) information indicating a request from the information requester 103 and information about thresholds used by the determiner 105 in determining whether to permit passage through the gate 12. The recorder 102 records programs executable by the controller 101. The recorder 102 may include multiple recording units (storage units) such as a read-only memory (ROM) for recording programs substantial to the system, a random-access memory (RAM) for high-speed access to recorded (or stored) data, and a hard disk drive (HDD) for recording large volumes of data.

The information requester 103 outputs information requesting a predetermined action to the output device 120, and requests the input device 110 to output action information (information about the predetermined action) in response to the request for the predetermined action. The action information includes, for example, a captured video of a user or a voice heard from a user.

The information obtainer 104 obtains the action information from the input device 110. The information obtainer 104 analyzes the action information and extracts (obtains) user information indicating the state or the movement of the user at the time of the predetermined action.

The determiner 105 determines whether to permit the user to pass through the gate 12 (whether to provide permission to pass) based on the user information. When permitting the user to pass through the gate 12, the determiner 105 outputs, to the control device 130, information indicating the permission.

The communicator 106 connects the information processing apparatus 100 to the input device 110, the output device 120, and the control device 130. The communicator 106 may be connected to the input device 110, the output device 120, and the control device 130 either wirelessly or with a wire. The communication may use any communication scheme.

[Permission Determination Process]

Figure 3:
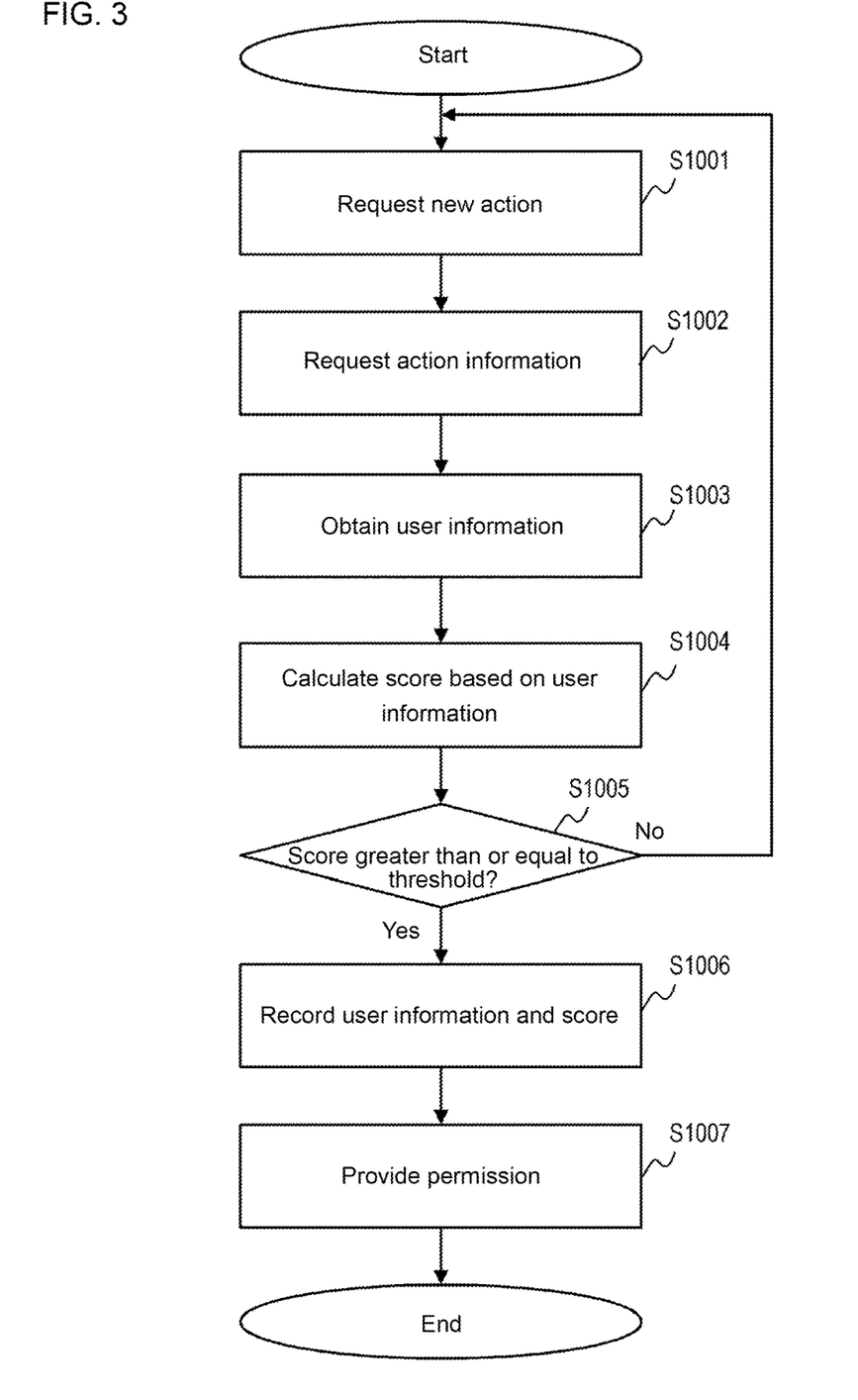
FIG. 3 is a flowchart showing a permission determination process according to the first embodiment.

A permission determination process (permission determination method) performed by the information processing apparatus 100 to determine whether to provide permission to the user to pass through (walk through) the gate 12 will now be described with reference to FIG. 3. FIG. 3 is a flowchart showing the permission determination process. The processing in the flowchart in FIG. 3 starts when the information processing apparatus 100 detects a user near the gate 12 in response to information from the input device 110 (e.g., information indicating a person detected with a motion sensor). The steps in the flowchart in FIG. 3 are performed by the controller 101 executing a program recorded in the recorder 102 to control the functional units.

In step S1001, the information requester 103 outputs information requesting a predetermined action to the output device 120. More specifically, the information requester 103 requests the user to perform a predetermined action. This causes the output device 120 to, for example, output a voice message requesting the user to perform a predetermined action or display a message requesting the predetermined action.

The information requester 103 requests a different predetermined action in accordance with the count of the processing in step S1001 being performed. In the processing in step S1001 performed for the first time, for example, the predetermined action is an action of taking off an object covering the user's face and being photographed. In the processing in step S1001 performed for the second time, the predetermined action is an action of taking off the user's jacket and extending the arms. In the processing in step S1001 performed for the third time, the predetermined action is an action of placing the user's baggage at a predetermined location. The predetermined action to be requested may be any action. In the processing performed for the fourth time or subsequently, the predetermined action may again be the action of taking off an object covering the user's face and being photographed. Information about the predetermined action to be requested from the user may be prestored in the recorder 102 in correspondence with the count of the processing in step S1001 being performed.

In step S1002, the information requester 103 requests the input device 110 to output action information through the communicator 106. The action information requested by the information requester 103 is not information preregistered with the information processing apparatus 100, but is information based on the current action of the user. For example, the input device 110 outputs a captured video (image) of the user to the information processing apparatus 100 as action information in response to the request.

In step S1003, the information obtainer 104 obtains action information from the input device 110 through the communicator 106 and extracts (obtains) user information from the action information. The user information is information obtained by analyzing the action information, or for example, information about a duration of time taken by the user to perform a predetermined action after the predetermined action is requested. The information obtainer 104 may record the obtained action information or the obtained user information into the recorder 102.

In step S1004, the determiner 105 calculates (determines) a score for determining whether to permit the user to pass through the gate 12 based on the obtained user information. The score is an index value indicating whether the user is a person to be permitted to enter a building or a room through the gate 12. More specifically, the score is an index value indicating the likelihood that the user is not a suspicious individual who may intend to commit a crime. The method for calculating the score will be described in detail later.

In step S1005, the determiner 105 determines whether the calculated score is greater than or equal to a predetermined threshold. The score greater than or equal to the predetermined threshold indicates that the user is highly likely to be a person to be provided with permission. For this score, the processing advances to step S1006. The score less than the predetermined threshold indicates that the user is sufficiently likely to be a suspicious individual. For this score, the processing returns to step S1001. The predetermined threshold may be a different value depending on a predetermined action requested by the information requester 103.

In step S1006, the determiner 105 records the calculated score and the user information used for the calculation into the recorder 102. The score and the user information are recorded to, for example, correct the predetermined threshold used in step S1005 or to correct the method for calculating the score used in step S1004.

In step S1007, the determiner 105 outputs, through the communicator 106, information to the control device 130 indicating that the passage through the gate 12 is permitted. The control device 130 thus causes the gate 12 to open. The user can then enter the intended building or room.

The information processing apparatus 100 repeatedly requests the user to perform a new action, obtains user information based on the user's action, and determines whether to provide permission based on the user information until determining to provide the permission about the passage to the user. The new action herein is an action that has not previously been requested by the information requester 103 to the user after the processing in the flowchart in FIG. 3 is started.

[Extracting User Information and Calculating Score]

Figure 4A:
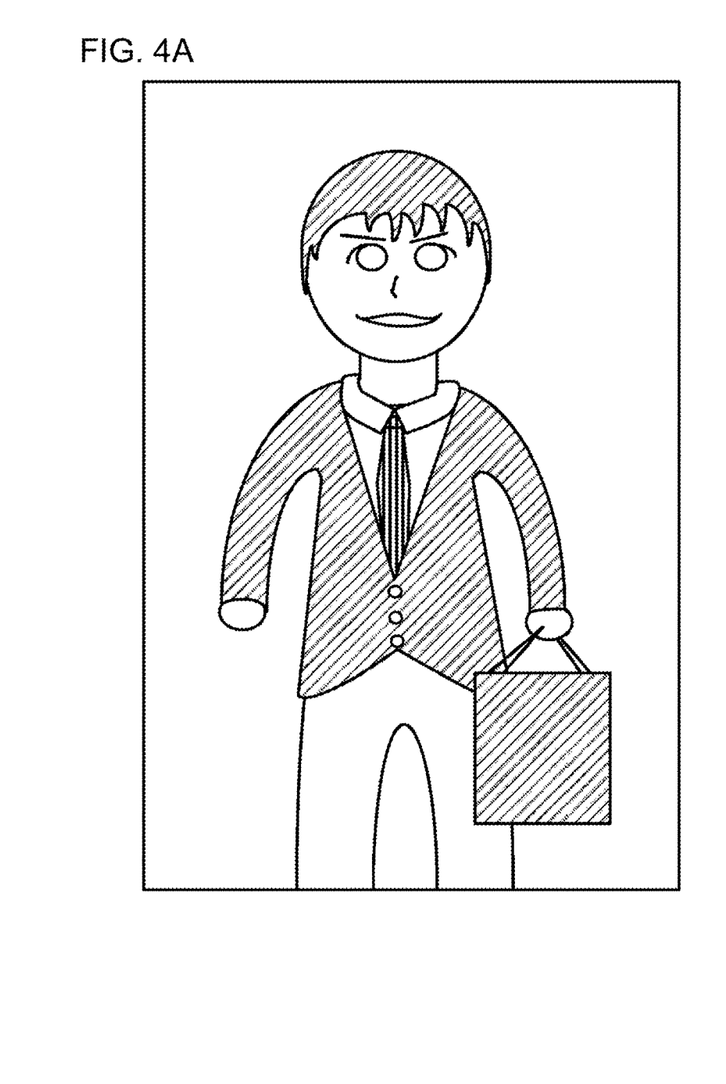
FIGS. 4A and 4B are diagrams of captured images of users in the first embodiment.
Figure 4B:
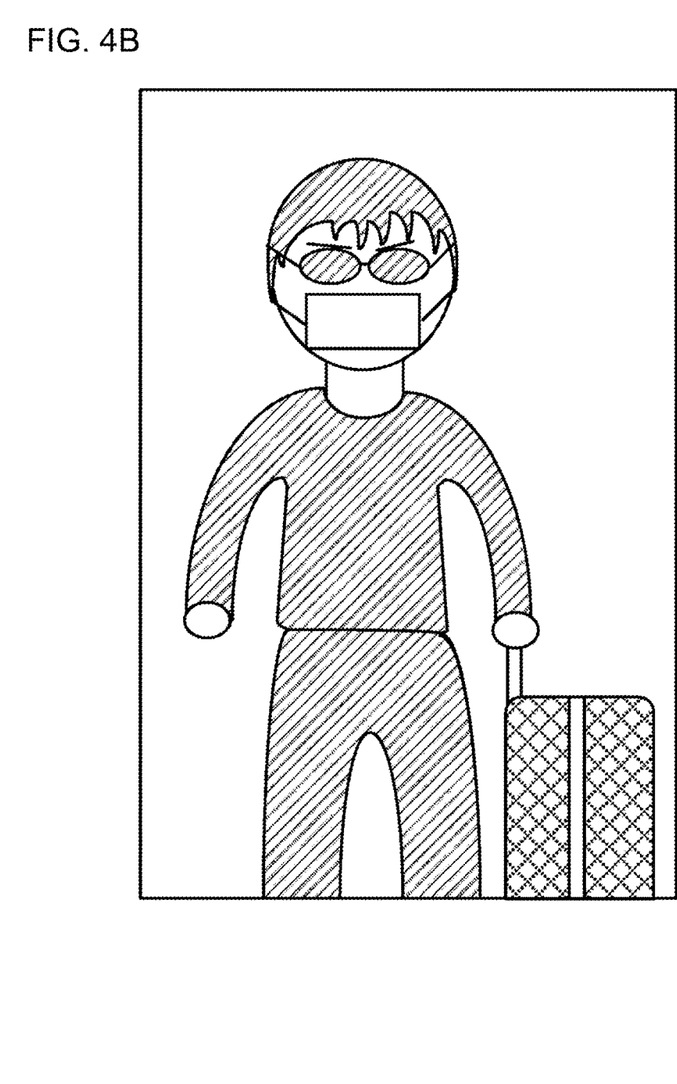

Extracting user information in step S1003 and calculating the score in step S1004 will now be described with reference to FIGS. 4A and 4B. In three examples described below, information about the face is extracted as user information, information about clothing is extracted as user information, and information about baggage is extracted as user information. FIGS. 4A and 4B each show a single video frame to serve as action information obtained by the information obtainer 104.

(When Extracting Information about Face)

When the information requester 103 requests the action of taking off an object covering the user's face and being photographed in step S1001, the information obtainer 104 obtains information about the user's face from a captured video of the user as user information in step S1003. More specifically, the information obtainer 104 obtains, as user information, a face cover degree $a_1$, which is the degree by which the user's face is covered at the time the user is requested to perform the action, a face cover degree $a_2$, which is the degree by which the user's face is covered after a predetermined time elapses from the time the action is requested, and a time $a_3$ from when the action is requested to when the user presses the imaging button. In the example shown in FIG. 4A, for example, the face of the user is covered by a lower degree. In the example shown in FIG. 4B, the face of the user is covered by a face mask and sunglasses and thus by a higher degree. Each of these face cover degrees can be indicated by the ratio of the area of an object covering the face to the area of the entire face.

In step S1004, the determiner 105 calculates, as a score SC, the sum of the weighted inverse of each of the face cover degree $a_1$, the face cover degree $a_2$, and the time $a_3$, as written in Formula 1. In the below formula, $wa_1$, $wa_2$, and $wa_3$ are weights.

$$SC = wa_1/a_1 + wa_2/a_2 + wa_3/a_3 \quad \text{Formula 1}$$

The weights $wa_1$, $wa_2$, and $wa_3$ may be corrected by the security system 10 or by the operator depending on whether the determination in step S1005 is previously performed as intended by the user. The same applies to weights $wb_1$, $wb_2$, and $wb_3$ and weights $wc_1$, $wc_2$, and $wc_3$ described below.

The information requester 103 may request an action other than the action of taking off an object covering the user's face and being photographed, such as an action of moving the face toward the imaging device (input device 110) or an action of smiling. The information obtainer 104 may also obtain, as user information, the degree of tension that can be observed from the user's face during the action, the age that can be estimated from the user's face, and the degree of eye movement (varying eye positions) of the user during the action.

(When Extracting Information about Clothing)

When the information requester 103 requests the action of taking off the user's jacket and extending the arms in step S1001, the information obtainer 104 obtains information about the user's clothing from a captured video of the user as user information in step S1003.

More specifically, the information obtainer 104 obtains, for example, an evaluation value $b_1$ indicating whether the user has taken off a jacket at the time the action is requested, an evaluation value $b_2$ indicating whether the user is dressed appropriately for the building or room to enter, and a time $b_3$ from when the action is requested to when the user takes off the jacket. The evaluation value $b_1$ is set to 1 when the user has taken off the jacket, and to 0 when the user has not taken off the jacket. The evaluation value $b_2$ is higher for more appropriate dressing for the building or the room. For a building intended for formal situations, for example, the evaluation value $b_2$ is high for a user wearing a tie and a jacket as shown in FIG. 4A, and is low for a user wearing casually as shown in FIG. 4B. The evaluation value $b_2$ can be calculated based on, for example, the color or the type of the clothing and the color or the type of the building. The evaluation value $b_2$ may be based on, for example, a reference value defined for each building or each room. For a wedding hall, for example, the evaluation value $b_2$ may be higher for the clothing colored brightly.

In step S1004, the determiner 105 calculates, as the score SC, the sum of the weighted evaluation value $b_1$, the weighted evaluation value $b_2$, and the weighted inverse of the time $b_3$, as written in Formula 2. In the below formula, $wb_1$, $wb_2$, and $wb_3$ are weights.

$$SC = wb_1 \times b_1 + wb_2 \times b_2 + wb_3/b_3 \qquad \text{Formula 2}$$

The information requester 103 may request an action other than the action of taking off the user's jacket and extending the arms, such as an action of unbuttoning a button, an action of turning up the sleeves, or an action of turning around at the user's location. The information obtainer 104 may also obtain, as user information, the degree by which the user's arms are extended and the degree of cleanliness of the user's clothing after a predetermined time elapses from the time the action is requested.

(When Extracting Information about Baggage)

When the information requester 103 requests the action of placing the user's baggage at a predetermined location in step S1001, the information obtainer 104 obtains information about the user's baggage from a captured video of the user as user information in step S1003.

More specifically, the information obtainer 104 obtains, as user information, a time $c_1$ from when the user is requested to perform the action to when the baggage is placed, an evaluation value $c_2$ indicating whether the type of the baggage is appropriate for the building or room to enter, and an evaluation value $c_3$ indicating whether the size of the baggage is appropriate for the building or room to enter. The evaluation values $c_2$ and $c_3$ are higher for the baggage that is more appropriate for the building or room to enter. For a bank at which large baggage is not typical, for example, the evaluation values $c_2$ and $c_3$ are both high for the baggage being a small paper bag as shown in FIG. 4A, and are both low for the baggage being a large suitcase as shown in FIG. 4B.

In step S1004, the determiner 105 calculates, as the score SC, the sum of the weighted inverse of the time $c_1$, the weighted evaluation value $c_2$, and the weighted evaluation value $c_3$, as written in Formula 3. In the below formula, $wc_1$, $wc_2$, and $wc_3$ are weights.

$$SC = wc_1/c_1 + wc_2 \times c_2 + wc_3 \times c_3 \qquad \text{Formula 3}$$

The information requester 103 may request an action other than the action of placing the user's baggage at a predetermined location, such as an action of rotating the baggage, an action of moving the baggage toward the imaging device (input device 110), or an action of showing the inside of the baggage. The information obtainer 104 may also obtain, as user information, the degree of cleanliness of the baggage or the degree by which the color of the baggage is close to the color of the clothing.

In the present embodiment, the information processing apparatus 100 determines whether to permit the user to pass through the gate 12 based on information about the user's current action, instead of using preregistered personal information. The information processing apparatus 100 can thus determine whether to provide permission to pass through the gate 12 to a user near the gate 12 without personal information about the user being prestored. This allows a user who seeks passage through the gate 12 to pass through the gate 12 without information being preregistered and is thus highly convenient.

For the score calculated based on user information (action information) being low, the user is repeatedly requested to perform another action. Until a sufficiently high score is obtained, the user is requested to perform a new action, for which the information processing apparatus obtains new user information. Any suspicious individual who intends to avoid being identified through multiple actions may not respond to the request. This further yields a lower score that does not permit the passage through the gate 12, thus further increasing security.

Although a captured video of a user is obtained as action information in the present embodiment, the action information may be other information. For example, the action information may be information about the user's voice or information about the distance between the user and the input device 110. For action information about the user's voice, the predetermined action may be, for example, an action of producing a predetermined voice, and the user information may be the vibrations of the voice or the time from the start to the end of the predetermined voice being heard. For action information about the distance between the user and the input device 110, the predetermined action may be, for example, an action of approaching the input device 110, and the user information may be the distance at the time of the request or a change in the distance after the request is provided to when the predetermined time elapses.

The information obtainer 104 may not obtain user information based on action information. The input device 110 may instead obtain user information in place of action information and may output the user information to the information obtainer 104.

Although the security system 10 determines whether to provide permission to pass through the gate 12 into a building or a room in the present embodiment, the security system 10 may also determine whether to provide any other permission. For example, the security system 10 may determine, based on action information (user information), whether to provide permission to access a predetermined web service or to provide permission to use a predetermined object.

In step S1007, the determiner 105 may provide a different permission to the user based on the score. For the score greater than or equal to a first threshold Th1, for example, the determiner 105 may determine that the user is highly likely to be a relevant worker and provide permission to enter a first room and a second room. For the score less than the first threshold Th1 and greater than a second threshold Th2 (Th2<Th1), for example, the determiner 105 may determine that the user is an unspecified person and provide permission to enter the first room alone.

First Modification

In the first embodiment, the score is calculated in step S1004 based on action information (user information) alone in response to a most recent action request provided in step S1001. In some embodiments, the score may be calculated in a different manner. More specifically, the score may be calculated in the manners (1) to (3) below based on past action information.

(1) In step S1004 performed for the first time, the score is calculated based on action information (user information) alone obtained in response to an action request provided in immediately preceding step S1001.

(2) In step S1004 performed for the second time, the score is calculated based on action information obtained in response to an action request provided in step S1001 performed for the first time and action information obtained in response to an action request provided in step S1001 performed for the second time.

(3) In step S1004 performed for the n-th time (n is a natural number), the score is calculated based on action information (user information) obtained in response to an action request provided in step S1001 performed for the first time, the second time, . . . , the (n−1)th time, and the n-th time.

In this case, the determiner 105 can calculate a new score by either simple addition or weighted addition of the score based on the preceding actions and the numerical value (score) based on the current action. For example, in step S1004 performed for the first time, the score is calculated using Formula 1 above. In step S1004 performed for the second time, an average of the values calculated using Formula 1 and Formula 2 is calculated as the score. In step S1004 performed for the third time, an average of the values calculated using Formula 1, Formula 2, and Formula 3 is calculated as the score.

In this manner, the past action information (user information) is used for calculating the score. This allows determination as to whether to permit a user to pass through the gate 12 based on more pieces of information and thus with higher accuracy.

Second Modification

In the first embodiment, the security system 10 calculates the score based on action information (user information) and determines whether to permit the user to pass through the gate 12 based on whether the score is greater than or equal to a threshold. In another modification, the security system 10 determines whether to provide permission based on a probability P of a user being a person to be provided with permission, instead of being based on the score.

Figure 5:
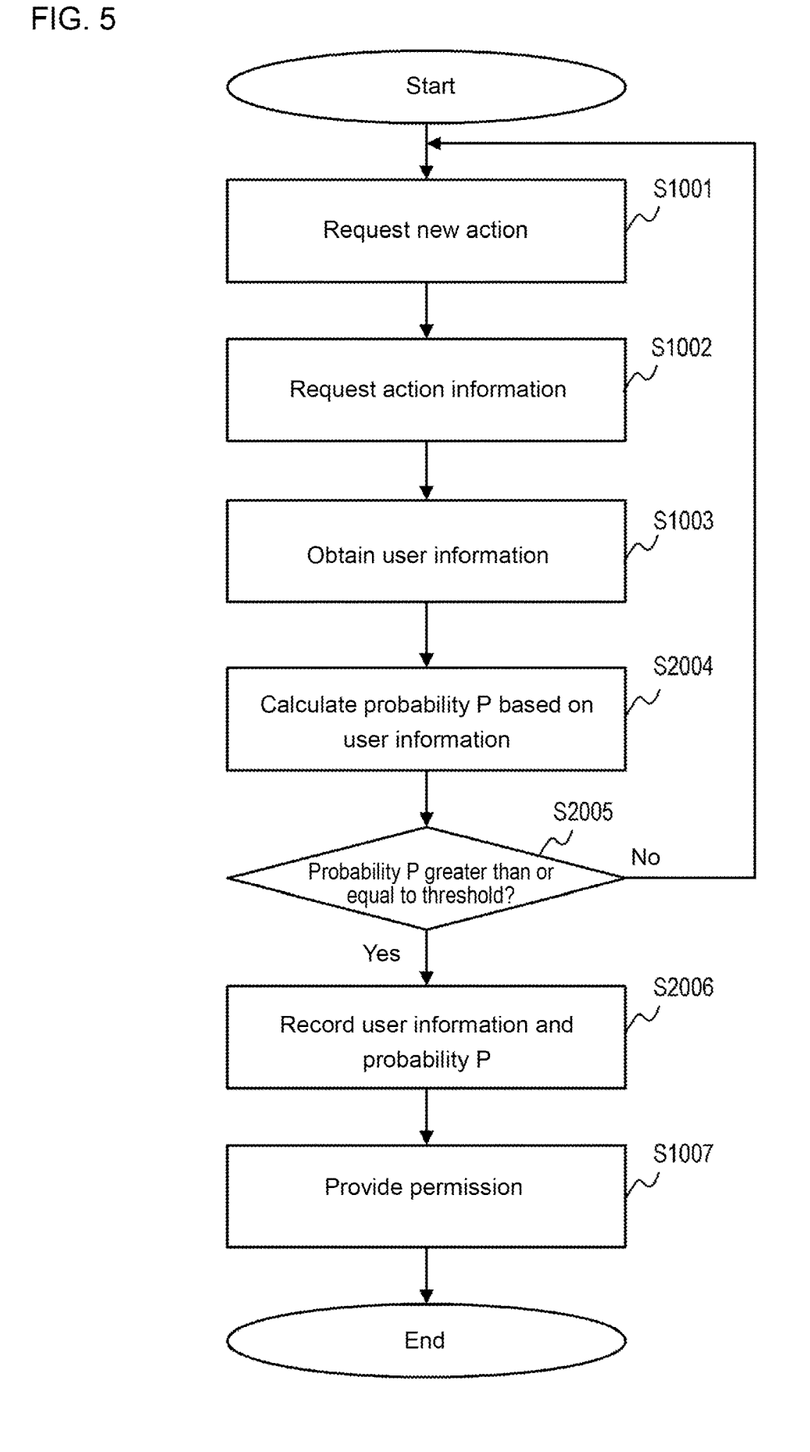
FIG. 5 is a flowchart showing a permission determination process according to a second modification.

A permission determination process according to the present modification will be described with reference to the flowchart in FIG. 5. The permission determination process according to the present modification differs from the process according to the first embodiment in steps S2004 to S2006. These steps will be described, without the other steps being described.

Figure 6A:
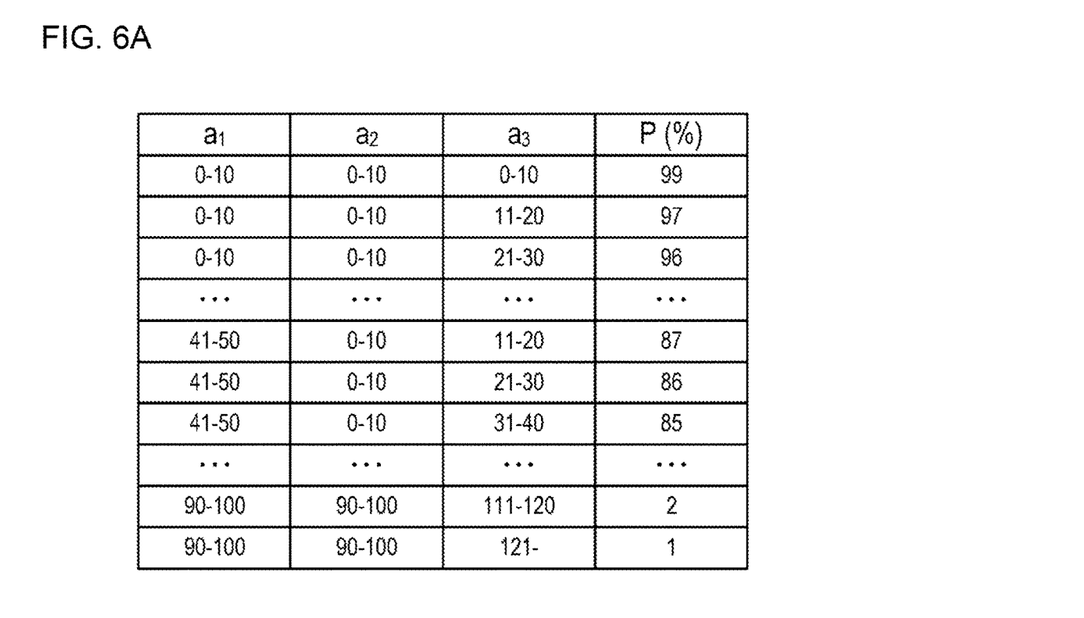
FIG. 6A is a table for calculating probabilities in the second modification.

In step S2004, the determiner 105 calculates the probability P of the user being a person to be provided with permission based on user information. In the example described below, extracted user information includes a face cover degree $a_1$, which is the degree by which the user's face is covered at the time the user is requested to perform the action, a face cover degree $a_2$, which is the degree by which the user's face is covered after a predetermined time elapses from the time the action is requested, and a time $a_3$ from when the action is requested to when the user presses the imaging button. In the present embodiment, the determiner 105 calculates the probability P using a table showing the correspondence between the face cover degree $a_1$, the face cover degree $a_2$, the time $a_3$, and the probability P shown in FIG. 6A. The table herein is generated based on the statistics of, for example, past users and prestored in the recorder 102. When, for example, the face cover degree $a_1$ is 50%, the face cover degree $a_2$ is 10%, and the time as is 30 seconds, the determiner 105 can calculate the probability P to be 86% by referring to the table in FIG. 6A. The table may not be used. A function may instead be used to return the probability P after the face cover degree $a_1$, the face cover degree $a_2$, and the time as are substituted into the function.

In step S2005, the determiner 105 determines whether the calculated probability P is greater than or equal to a predetermined threshold. When the probability P is greater than or equal to the predetermined probability, the processing advances to step S2006. When the probability P is less than the predetermined probability, the processing returns to step S1001. The predetermined probability is to be a value that is sufficient to determine that the user is a person to be provided with permission. The predetermined probability may be, for example, 90%. The predetermined probability may be set as appropriate for the degree of security intended by the operator of the security system 10.

In step S2006, the determiner 105 records the calculated probability P and the user information used for the calculation into the recorder 102. The probability P and the user information are recorded to, for example, correct the table or the function used in step S2004.

The probability P greater than or equal to the predetermined probability causes the passage through the gate 12 to be permitted. The probability is more intuitive than the score for an operator who sets up the system, thus facilitating changes in the system design.

Third Modification

In the second modification, the security system 10 determines whether to provide permission about passage of the user based on the probability P of the user being a person to be provided with permission. In another modification, the security system 10 calculates, based on user information, a probability P1 of a user being an unspecified person, a probability P2 of a user being a relevant worker, and a probability P3 of a user being a suspicious individual, and determines whether to permit the user to pass through the gate 12 based on these probabilities. In the present embodiment, a suspicious individual refers to a person not to receive permission to pass through the gate 12, and an unspecified person and a relevant worker refer to persons to receive permission to pass through the gate 12.

Figure 7:
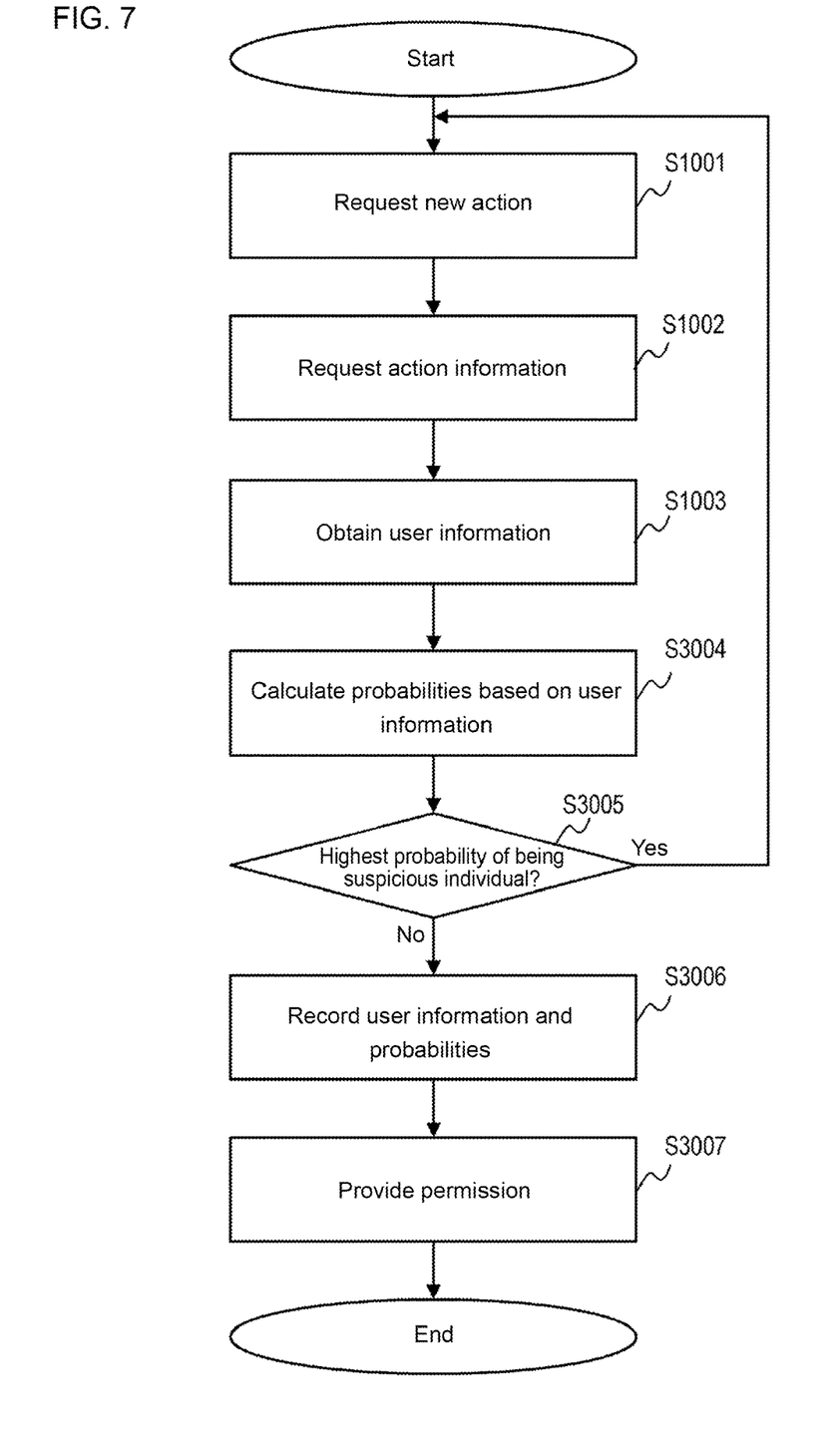
FIG. 7 is a flowchart showing a permission determination process according to the third modification.

A permission determination process according to the present modification will be described with reference to the flowchart in FIG. 7. The permission determination process according to the present modification differs from the process according to the first embodiment in steps S3004 to S3007. These steps will be described, without the other steps being described.

Figure 6B:
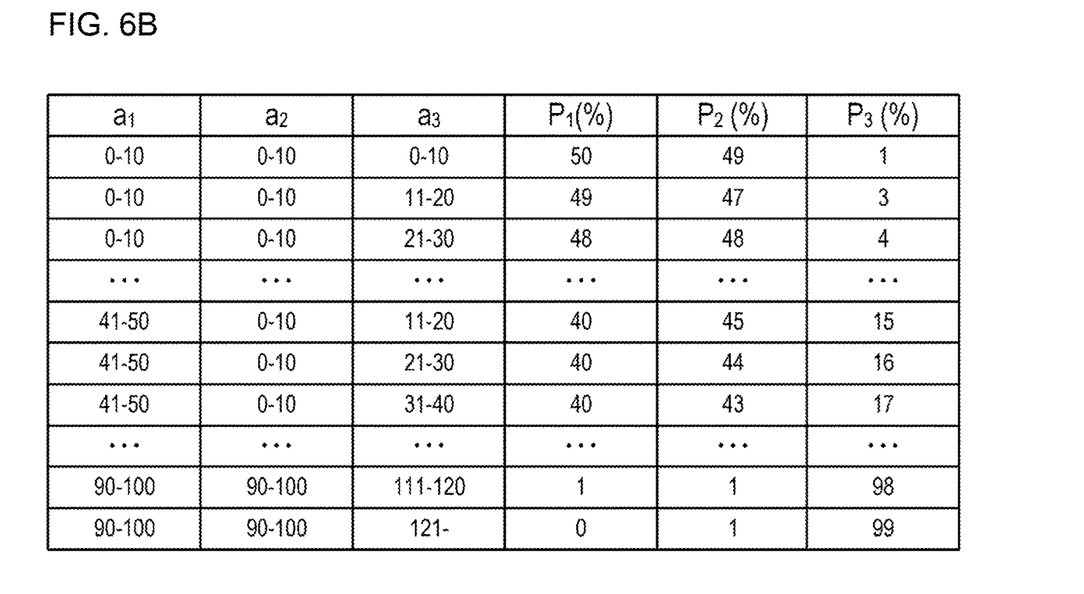
FIG. 6B is a table for calculating probabilities in a third modification.

In step S3004, the determiner 105 calculates, based on user information, the probability P1 of a user being an unspecified person, the probability P2 of a user being a relevant worker, and the probability P3 of a user being a suspicious individual. In the example described below, the face cover degree $a_1$, the face cover degree $a_2$, and the time $a_3$ are extracted as user information. In the present modification, the determiner 105 calculates the probabilities P1, P2, and P3 using a table showing the correspondence between the face cover degree $a_1$, the face cover degree $a_2$, the time $a_3$, and the probabilities P1 to P3 as shown in FIG. 6B. The table is generated based on the statistics of, for example, past users and prestored in the recorder 102. When, for example, the face cover degree $a_1$ is 50%, the face cover degree $a_2$ is 10%, and the time $a_3$ is 30 seconds, the determiner 105 can calculate the probability P1 to be 40%, the probability P2 to be 44%, and the probability P3 to be 16% by referring to the table in FIG. 6B. The table may not be used. A function may instead be used to return the probabilities P1 to P3 after the face cover degree $a_1$, the face cover degree $a_2$, and the time $a_3$ are substituted into the function.

In step S3005, the determiner 105 determines whether the probability P3 is the highest of the calculated probabilities P1 to P3. When the probability P3 is the highest, the processing returns to step S1001, and otherwise advances to step S3006.

In step S3006, the determiner 105 records the calculated probabilities P1 to P3 and the user information used for the calculation into the recorder 102. The probabilities P1 to P3 and the user information are recorded to, for example, correct the table or the function used in step S3004.

In step S3007, the determiner 105 notifies the control device 130 that the passage through the gate 12 is permitted. The determiner 105 may permit passage through the gate 12 and a second gate in response to the probability P1 being the highest of the probabilities P1 to P3, and may permit passage through the gate 12 and a third gate in response to the probability P2 being the highest of the probabilities P1 to P3. More specifically, the determiner 105 may classify users based on their action information and change the details of the permission to provide to each user based on the classification.

In this manner, the probabilities of users being under these multiple types of persons, including persons not to provide permission to, are calculated. This process can also determine the type of each user, thus allowing different permissions to be provided to different users. This allows more flexibility in providing permissions to users.

In step S3005, the determination may simply be whether the user is a suspicious individual. When the user is determined to be a suspicious individual, the processing returns to step S1001, and otherwise advances to step S3006. The determination as to whether the user is a suspicions individual may be performed using artificial intelligence (AI). For example, a discriminator (trained model) trained through deep learning can be incorporated into the security system 10 to perform the determination using AI. More specifically, the security system 10 may use a trained model resulting from machine learning, such as deep learning. The security system 10 inputs the obtained user information into the trained model and determines whether the user is a suspicious individual using the trained model. The trained model can be generated in the manner described below. First, multiple combinations of user information and information indicating that the user is a suspicious individual are input, as training data sets for learning, into a model to be trained. A trained model is then generated from the training data based on any known supervised machine learning algorithm. The trained model may be generated based on hierarchical neural networks or other machine learning algorithms such as support-vector machines (SVMs), other than deep learning (multilayer neural networks).

The above embodiments and modifications may be implemented in any combinations. For example, the probabilities in the second modification and the third modification may also be calculated further using user information extracted in the past as in the first modification.

The scope of the claims is construed without being limited to the features described in the embodiments described above. The scope of the claims is construed to include the scope understandable by those skilled in the art to solve intended issues in view of the common technical knowledge at the time of filing.

APPENDIX 1

An information processing apparatus (100), comprising:
a requester (103) configured to request a user to perform an action in response to the user seeking permission;
an obtainer (104) configured to obtain user information about the user in response to the user being requested to perform the action;
a determiner (105) configured to determine whether to provide the permission to the user based on the user information obtained by the obtainer; and
a controller (101) configured to perform control to repeatedly cause, in response to the determiner determining that the permission is not to be provided to the user, the requester to request the user to perform a new action not previously requested by the information requester, the obtainer to obtain new user information about the user, and the determiner to determine whether to provide the permission based on the new user information.

APPENDIX 2

A permission determination method, comprising:
a step (S1001) of requesting a user to perform an action in response to the user seeking permission;
a step (S1003) of obtaining user information about the user in response to the user being requested to perform the action; and
a step (S1005) of determining whether to provide the permission to the user based on the obtained user information, wherein in response to determining that the permission is not to be provided to the user in the step of determining, requesting the user to perform a new action not previously requested in the step of requesting, obtaining new user information about the user in the step of obtaining, and determining whether to provide the permission based on the new user information in the step of determining are performed repeatedly.

DESCRIPTION OF SYMBOLS

10: Security system, 11: User, 12: Gate
100: Information processing apparatus, 101: Controller, 102: Recoder, 103: Information requester,
104: Information obtainer, 105: Determiner, 106: Communicator
110: Input device, 120: Output device, 130: Control device

The invention claimed is:

1. An information processing apparatus, comprising:
a requester configured to request a user who has not preregistered personal information with the information processing apparatus to perform an action in response to the user seeking permission;
an obtainer configured to obtain user information about the user in response to the user being requested to perform the action;
a determiner configured to determine whether to provide the permission to the user based on the user information obtained by the obtainer; and
a controller configured to perform control to repeatedly cause, in response to the determiner determining that the permission is not to be provided to the user, the requester to request the user to perform a new action not previously requested by the requester, the obtainer to obtain new user information about the user, and the determiner to determine whether to provide the permission based on the new user information,
wherein it is predetermined whether to be provided with the permission or not for each person type of a plurality of person types, and
wherein the determiner calculates, for each of the plurality of person types, a probability of the user seeking the permission corresponding to the person type based on the user information, estimates that the person type with the highest probability of the plurality of person types is the person type to which the user seeking the permission corresponds, and determines that the permission is to be provided to the user in a case where the estimated person type to which the user seeking the permission corresponds is a person type to be provided with the permission.

2. The information processing apparatus according to claim 1, wherein
the controller performs control to repeat, in response to the determiner determining that the permission is not to be provided to the user, the following until the determiner determines that the permission is to be provided to the user: (i) causing the requester to request the user to perform the new action, (ii) causing the obtainer to obtain the new user information about the user, and (iii) causing the determiner to determine whether to provide the permission based on the new user information.

3. The information processing apparatus according to claim 1, wherein
the action requested by the requester is at least one selected from a group consisting of an action associated with a face, an action associated with clothing, and an action associated with baggage.

4. The information processing apparatus according to claim 1, wherein
the obtainer obtains the user information from an image of the user captured in response to the user being requested to perform the action.

5. The information processing apparatus according to claim 4, wherein
the captured image of the user is at least one selected from a group consisting of an image of a face of the user, an image of baggage held by the user, and an image of clothing of the user.

6. The information processing apparatus according to claim 1, wherein
the user information includes information about time from when the user is requested to perform the action to when the user performs the action.

7. The information processing apparatus according to claim 1, wherein
the user information includes information about a degree by which a face of the user is covered at a time of the action being requested.

8. The information processing apparatus according to claim 1, wherein
the user information is information about at least one selected from a group consisting of a size of baggage held by the user and a type of the baggage held by the user in response to the user being requested to perform the action.

9. The information processing apparatus according to claim 1, wherein
the determiner provides different permissions depending on the person type with the highest probability.

10. The information processing apparatus according to claim 1, wherein the information processing apparatus is configured to provide the user access to a restricted area or to not allow the user to access the restricted area according to whether the determiner determines to provide the permission to the user, and
in a case where the determiner determines to provide the permission to the user, the information processing apparatus is configured to provide the user access to the restricted area.

11. The information processing apparatus according to claim 10, wherein in the case where the determiner determines to provide the permission to the user, the information processing apparatus is configured to cause an opening of a gate blocking access to the restricted area to thereby provide the user access to the restricted area.

12. A permission determination method performed by a processor of an information processing apparatus, the permission determination method comprising:
a step of requesting a user who has not preregistered personal information with the information processing apparatus to perform an action in response to the user seeking permission;
a step of obtaining user information about the user in response to the user being requested to perform the action; and
a step of determining whether to provide the permission to the user based on the obtained user information,
wherein in response to determining that the permission is not to be provided to the user in the step of determining, requesting the user to perform a new action not previously requested in the step of requesting, obtaining new user information about the user in the step of obtaining, and determining whether to provide the permission based on the new user information in the step of determining are performed repeatedly, wherein it is predetermined whether to be provided with the permission or not for each person type of a plurality of person types, and wherein the determining step includes calculating, for each of the plurality of person types, a probability of the user seeking the permission corresponding to the person type based on the user information, estimating that the person type with the highest probability of the plurality of person types is the person type to which the user seeking the permission corresponds, and determining that the permission is to be provided to the user in a case where the estimated person type to which the user seeking the permission corresponds is a person type to be provided with the permission.

13. The permission determination method according to claim 12, further comprising:

providing the user access to a restricted area or not allowing the user to access the restricted area according to whether it is determined to provide the permission to the user, wherein in a case where it is determined to provide the permission to the user, the user is provided access to the restricted area.

14. The permission determination method according to claim 13, further comprising causing, in the case where it is determined to provide the permission to the user, an opening of a gate blocking access to the restricted area to thereby provide the user access to the restricted area.

15. A non-transitory computer readable medium storing a program for causing a computer to perform operations included in the permission determination method according to claim 12.

* * * * *